United States Patent
Munoz Delgado

(10) Patent No.: US 11,366,987 B2
(45) Date of Patent: Jun. 21, 2022

(54) METHOD FOR DETERMINING EXPLAINABILITY MASK BY NEURAL NETWORK, SYSTEM AND MEDIUM

(71) Applicant: Robert Bosch GmbH, Stuttgart (DE)

(72) Inventor: Andres Mauricio Munoz Delgado, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 17/136,807

(22) Filed: Dec. 29, 2020

(65) Prior Publication Data

US 2021/0232865 A1 Jul. 29, 2021

(30) Foreign Application Priority Data

Jan. 23, 2020 (EP) .................................. 20153424

(51) Int. Cl.
*G06K 9/62* (2022.01)
*G06N 3/04* (2006.01)
(Continued)

(52) U.S. Cl.
CPC ......... *G06K 9/6262* (2013.01); *G06K 9/6256* (2013.01); *G06K 9/6268* (2013.01);
(Continued)

(58) Field of Classification Search
CPC .. G06K 9/6262; G06K 9/6256; G06K 9/6268; G06K 9/6267; G06K 9/6218;
(Continued)

(56) References Cited

U.S. PATENT DOCUMENTS

2019/0220691 A1* 7/2019 Valpola .................... G06N 3/08
2020/0394459 A1* 12/2020 Xu ......................... G06K 9/6256
2021/0056355 A1* 2/2021 Luss ..................... G06K 9/6201

OTHER PUBLICATIONS

Ning Xie, "Relating Input Concepts to Convolutional Neural Network Decisions" Nov. 2017 arxiv.org/abs/1711.08006 (Year: 2017).*
(Continued)

*Primary Examiner* — Juan A Torres
(74) *Attorney, Agent, or Firm* — Norton Rose Fulbright US LLP; Gerard Messina

(57) ABSTRACT

A computer-implemented method of determining an explainability mask for classification of an input image by a trained neural network. The trained neural network is configured to determine the classification and classification score of the input image by determining a latent representation of the input image at an internal layer of the trained neural network. The method includes accessing the trained neural network, obtaining the input image and the latent representation thereof and initializing a mask for indicating modifications to the latent representation. The mask is updated by iteratively adjusting values of the mask to optimize an objective function, comprising i) a modification component indicating a degree of modifications indicated by the mask, and ii) a classification score component, determined by applying the indicated modifications to the latent representation and determining the classification score thereof. The mask is scaled to a spatial resolution of the input image and output.

16 Claims, 6 Drawing Sheets

(51) Int. Cl.
*G06N 3/08* (2006.01)
*G06V 30/24* (2022.01)

(52) U.S. Cl.
CPC ............... *G06N 3/04* (2013.01); *G06N 3/08* (2013.01); *G06V 30/2504* (2022.01)

(58) Field of Classification Search
CPC .......... G06N 3/04; G06N 3/08; G06N 3/0454; G06V 30/2504; G06V 10/454; G06V 10/82
USPC ........................................................ 382/157
See application file for complete search history.

(56) References Cited

OTHER PUBLICATIONS

Alzantot, "NeuroMask: Explaining Predictions of Deep Neural Networks through Mask Learning", Aug. 2019 arxiv.org/abs/1908.04389. (Year: 2019).*

Ruth Fong, et al., "Interpretable Explanations of Black Boxes By Meaningful Perturbation," Cornell University, 2018, pp. 1-9. <https://arxiv.org/pdf/1704.03296.pdf> Downloaded Dec. 29, 2020.

Selvaraju, R., et al., "Grad-Cam: Visual Explanations From Deep Networks Via Gradientbased Localization," Cornell University, 2019, pp. 1-23. <https://arxiv.org/pdf/1610.02391.pdf> Downloaded Dec. 29, 2020.

Hsu, et al.: "Unsupervised CNN-Based Co-saliency Detection with Graphical Optimization", ECCV 2018, LNCS 11209, (2018), pp. 502-518, XP047488924.

Selvaraju, et al.: "Grad-CAM: Visual Explanations from Deep Networks via Gradient-based Localization", 2017 IEEE International Conference On Computer Vision (ICCV), (2017), pp. 618-626, XP033282917.

Zagoruyko and Komodakis: "Paying More Attention to Attention: Improving the Performance of Convolutional Neural Networks via Attention Transfer", publ. as conference paper at ICLR 2017, pp. 1-13, XP055580702.

* cited by examiner and as a consequence, their true generalization performance has often been called into question. As with any other software component intended for deployment in the field, it is critical that the models can be quantitatively verified and validated, e.g., to establish the degree to which a model has learned the desired input-to-output relationship. Current state-of-the-art techniques in machine and deep learning lack metrics and practices to measure this effect, often working with limited (and thus inherently biased) datasets, and producing models that are overparametrized in comparison to the amount of data available. Thus there is often a wide gap between what a model has actually learned and what the implementer thinks the model has learned.

METHOD FOR DETERMINING EXPLAINABILITY MASK BY NEURAL NETWORK, SYSTEM AND MEDIUM

CROSS REFERENCE

The present application claims the benefit under 35 U.S.C. § 119 of European Patent Application No. EP 20153424.5 filed on Jan. 23, 2020, which is expressly incorporated herein by reference in its entirety.

FIELD

The present invention relates to a computer-implemented method for determining a mask for a classification of an input image by a trained neural network by a trained neural network, and to a corresponding system. The present invention further relates to a computer-readable medium comprising instructions to perform one of the above methods.

BACKGROUND INFORMATION

Machine-learned ('trained') models are widely used in many real-life application domains, such as autonomous driving, robotics, manufacturing, building control, etc. For example, machine learnable models such as neural networks may be trained to infer a state of a physical system, such as an autonomous vehicle or a robot, etc., or the system's environment, e.g., the road on which the vehicle is travelling, the robot's workspace, etc., based on sensor data which is acquired by one or more sensors. Having inferred the state, the physical system may be controlled, e.g., using one or more actuators, or its operation may be monitored.

Generally, as is conventional in machine learning, a machine-learnable model such as a neural network may be trained on training data in order to provide an output, such as a prediction or a decision. An example of a decision is a classification. By training the neural network, the neural network may provide such predictions or decisions without being explicitly programmed to do so. For example, for classifying an image, the neural network may be trained on a training dataset comprising images whose classifications are known. Accordingly, the trained neural network may be trained to determine a classification of an input image. For example, a neural network may be trained as a multiclass identifier, by which an image may be classified as, e.g., "cat", "dog", or "tree". Another example is that the trained neural network may be trained to be a binary classifier (e.g., classifying an input image into one of only two complementary categories, "OK" or "NOK"). However, the trained neural network may also be trained on a dataset of images whose categories are unknown, e.g., obtained by clustering/automatic classification.

In general, neural network may comprise deep neural networks and/or convolutional neural networks (CNNs).

The classifications by machine learned models such as trained neural networks may be used in myriad applications, such as optical quality inspection in manufacturing processes, or hazard detection in autonomous vehicles. It will be understood that in these and other application domains, it is relevant to know and understand how a machine learned model arrives at its conclusion.

Therefore, explainability is a core element of both model verification (did we build the model right?) and validation (did we build the right model?). It is a conventional finding that large, state-of-the-art network models can be easily tricked into providing false, high confidence predictions;

Over the past several years, the need for providing explanations along with model predictions has been recognised, and several approaches have been proposed and used at an academic level with varying degrees of success. In the context of image classification networks, for example, most explanation methods are a mix of black-box (i.e., model-independent) and white-box methods that compute attributions on the pixels of the input image. That is, these methods study the local behaviour of the classifier on a given input. These attribution maps are also often called explanation, saliency or attention maps and are frequently represented as heatmaps overlaid on the input image, where areas of the input image that cause the model to classify the input as one class or another are highlighted.

In "Interpretable explanations of black boxes by meaningful perturbation" by Ruth Fong and Andrea Vedaldi, arXiv preprint arXiv:1704.03296, 2017 (DOI: 10.1109/ICCV.2017.371), the model is treated as a black box, and an optimization process is used in order to learn a meaningful mask over the input image that forces the model to classify its input differently.

In "Grad-CAM: Visual Explanations from Deep Networks via Gradient-based Localization" by Ramprasaath R. Selvaraju et al., arXiv preprint arXiv:1610.02391, 2017 (DOI: 10.1109/ICCV.2017.74), the problem is approached differently. In this work, it is argued that it is generally sufficient to look at the data representations in the deepest convolutional layers in order to know where the model is looking in the input image.

However, the inventors have identified a need for a yet more quantitative assessment on how the mask actually affects the classification of the input. This is particularly important for real-world deployment scenarios where a good understanding should be established for why a saliency is produced or recommended. A model's drop in classification accuracy of the input perturbed by the saliency is one such quantitative measure of this impact. There is therefore a need to enable more accurate quantitative metrics for explainability of models to be determined.

SUMMARY

In accordance with a first aspect of the present invention, a computer-implemented method of determining an explainability mask is provided. In accordance with another aspect of the present invention, a corresponding computer-readable medium is provided. In accordance with an aspect of the present invention, a corresponding system is provided.

Aspects of the present invention relate to a computer-implemented method of determining an explainability mask for a classification of an input image by a trained neural network. In accordance with an example embodiment of the present invention, the trained neural network may be configured to determine the classification of the input image by determining a latent representation of the input image at an internal layer of the trained neural network and by determining the classification of the input image from the latent representation of the input image. Determining the classification of the input image may comprise determining a classification score of the input image. The example method may comprise accessing the trained neural network, obtaining the input image and the latent representation of the input image and initializing a mask for indicating modifications to the latent representation. The method further comprises updating the mask by iteratively adjusting values of the mask to optimize an objective function. The objective function comprises a modification component indicating a degree of the modifications indicated by the mask. The classification score component may be determined by applying the modifications indicated by the mask to the latent representation to obtain a perturbed latent representation and determining the classification score of the perturbed latent representation according to the trained neural network. The method further comprises scaling the mask to a spatial resolution of the input image to obtain the explainability mask and outputting the explainability mask.

The above aspects involve obtaining a latent representation of the input image. The latent representation, also known as an activation volume, is an output of the internal (e.g., hidden) layer of the trained neural network. An internal layer is a layer of the trained neural network between the input layer and the output layer. For example, a latent representation of layer k may be considered as the output of the k-th layer of the trained neural network. The latent representation may comprise activations, e.g., weights, of nodes of the internal layer of the neural network. Consequently, the latent representation will typically have a coarser spatial resolution than the input image, and commonly relate to deeper, more complex structures of the input image. The latent representation may provide an abstracted, more semantic, and/or compressed representation of the input image, whilst preserving a spatial relationship with the input image.

The above aspects involve a mask for the latent representation of the input image. Masks may also be referred to as heatmaps. The mask may indicate modifications to the latent representation of the input image. For instance, the mask may indicate portions of the latent representation of the input image to which a modification may be applied. The modifications may relate to a means of obscuring a region of the latent representation either completely or partially, and/or a means of blurring a region of the latent representation. The modifications may be considered to "block" or suppress activations of the layer of the trained neural network from which the latent representation is output. The amount or degree of modifications to be applied to which part of the latent representation of the input image may be determined by an optimization process.

The mask may be determined in order to indicate modifications to the latent representation of the input image that are relevant to the obtained classification. For instance, the mask may indicate portions of the latent representation to modify in order to affect the classification indicated by the trained neural network. The modifications may lead to a different classification or to a significant drop in a confidence score/confidence measure for the classification, e.g., as measured by the classification score. The mask is updated (e.g., the values of the mask are changed) by optimizing an objective function, which will be described further below, which may balance the importance of a small amount of modifications with the importance of a low classification score. In other words, the mask may be updated in order to determine a small, or minimal, region of the latent representation, and therefore a small or minimal region of the input image, that is most relied upon by the trained neural network in its determination of the classification. Doing so may identify a region containing the features of the input image which the trained neural network weights heavily. For example, if the input image was an image of a cat, the objective function may be optimized such as to identify a mask covering as small an area as possible, for instance, the cat's ears, which, when obscured, result in the classification score corresponding to the class of "cat" to be, for example, lower than a threshold, or until the trained neural network no longer determines the input image to contain a cat. This would indicate that the trained neural network considers the cat's ears to be a primary indicator of what defines a "cat". Hence, the mask may indicate the area of the input image most responsible for the trained neural network for reaching its determined classification. In the above aspects, the mask is applied to the latent representation of the input image. Since the latent representation preserves the spatial relationship with the input image, the concept remains the same— identifying as small an area of the latent representation to obscure which provides as low a classification score for the corresponding class as possible will by proxy identify a correspondingly small area of the input image. Applying the mask to the latent representation of the input image produces a perturbed latent representation.

The above measures also involve determining a classification score of the perturbed latent representation according to the trained neural network. The trained neural network may be configured to provide a classification as well as a confidence of that classification. The classification score is typically used to indicate this confidence.

The above measures also involve carrying out an optimization to determine the mask. The optimization is performed by optimizing an objection function comprising a modification component and a classification score component. The modification component may indicate the amount or degree of modifications indicated by the mask. The optimization takes into consideration both the amount or degree of modifications indicated by the mask as well as the classification score resulting from the perturbation of the latent representation by said mask.

The above measures also involve scaling the mask to a spatial resolution of the input image, in order to obtain the explainability mask. The scaling may be achieved through a multitude of scaling means, including by upsampling. For example, bilinear upsampling may be used in order to arrive at a spatial resolution matching that of the input image. Other techniques for scaling the mask also exist and may be used, such as a series of transposed convolutions or deconvolutions.

The above measures also involve outputting the explainability mask. An explainability mask may also be referred to as a saliency mask or saliency map. The explainability mask may be output in a sensory-perceptible form, such as via a display, which may enable a user to see the explainability mask. In some embodiments, the explainability mask is inverted prior to being displayed, in order to display a more intuitive image. In some embodiments, the explainability mask may be output to a processor subsystem, such as an external processor subsystem or to a function or computer program within the same system in which the method is implemented, such as for use in an automated system. In some embodiments, the explainability mask is output to an external server or cloud-based storage, or to a remote database.

The inventors have found that determining the explainability mask in accordance with example embodiments of the present invention results in masks that provide improved explainability of the trained neural network. By considering both the amount or degree of modifications applied to the perturbed latent representation and the resulting classification score of the perturbed latent representation, a small yet important region or feature of the input image may be identified as being primarily responsible for a resulting classification.

Specifically, by applying modifications to a latent representation of an internal layer of the trained neural network, adversarial solutions may be avoided or reduced. Adversarial solutions are solutions in which a mask is so small and the change made to the input image in essence minimal (for example, barely perceivable), but that nevertheless still causes a large change in the classification output of the model. Since the resolution of a latent representation of an internal layer of the trained neural network is typically coarser than that of the input image, adversarial solutions may be less likely to be translated. Moreover, adversaries may generally arise by blocking individual pixels. By blocking more complex concepts, as is achieved by applying a mask to a latent representation, such adversaries may be avoided or mitigated.

Specifically, by determining the explainability mask in accordance with example embodiments of the present invention, a user may determine whether the trained neural network has learned as much as he or she expected. For example, if an explainability mask reveals that the trained neural network relies heavily on the detection of grass in order to classify a horse, the user may consider that the trained neural network has not been adequately trained, and perhaps a more diverse training dataset is required. Thus, the explainability map may also reveal hidden biases, and may prompt a user to address such biases by retraining or further developing the neural network.

The optimization also provides a quantitative measure of the importance of an explanation identified by the mask. For example, the difference between the classification score of the perturbed latent representation and the classification score of the input image in relation to the degree or amount of modifications may quantitatively describe the relevance of the explanation.

Optionally, updating the mask comprises ending the updating operation if the classification score of the perturbed latent representation meets a classification threshold. For example, a classification threshold may be determined a priori as a fixed score value or as a relative amount of the classification score of the input image. When the classification score meets the threshold, the optimization process may be terminated. This way, unnecessary further iterations of the optimization process are avoided, reducing the runtime of the method and the power consumed by the system in which the method is implemented. As the threshold is predetermined, a user may be able to cater the method to suit his or her needs—for example, in order to obtain a mask that highlights the deep neurons that are most responsible for activating a particular output class, the user may set the threshold value to a value approaching zero.

Optionally, updating the mask comprises iteratively adjusting the values of the mask for a predetermined number of iterations. A user may determine a priori a number of iterations over which to optimize the mask. In some cases, this may refer to a maximum number of iterations, and the optimization process may terminate, for example if the classification score reaches the classification threshold. However, it is also possible to set a predetermined number of iterations without a termination condition based on the classification score. By setting a predetermined number of iterations over which to optimize the mask, it is possible to troubleshoot the system without entering infinite loops. Additionally, a user may be alerted to a problem if the optimization of the mask does not meet the requisite criteria within the predetermined number of iterations. The termination of the optimization after the predetermined number of iterations may further enable the method to proceed in different ways, such as by extending the mask to a previous layer.

Optionally, the method further comprises determining if, after updating the mask, the classification score of the perturbed latent representation meets a classification threshold. If the classification score of the perturbed latent representation does not meet a classification threshold, the method further comprises extending the mask to additionally cover an additional layer representation of the input image at a preceding layer of the trained neural network, and repeating the updating step. In other words, it may be that the initially selected layer does not include the filters that are most relevant for the classification. By extending the mask to a preceding latent representation (i.e., to a latent representation of a preceding layer of the trained neural network), the filters of the preceding layer may also be explored. In some cases, the mask may be extended to additionally cover a preceding latent representation after the updating step has iterated for a predetermined number of iterations.

Optionally, initializing the mask comprises assigning the mask values which replace the latent representation with a zero-activation latent representation. That is, the mask may be initialized such that activations of the layer producing the latent representation are effectively "blocked". During the optimization, the mask may then be updated such that the activations of the layer producing the latent representation are gradually "unblocked", and the objective function may be formulated to maximise a classification score, whilst maximizing the modification component of the objective function. Conceptually, this approach determines the minimum regions to "unblock" (in other words, the maximum complementary region to remain "blocked") of the input image which most confidently produce the classification.

Optionally, initializing the mask comprises assigning the mask values which have no perturbative effect on the latent representation. In this case, the mask is initialized to be effectively "invisible", with no effect on any of the activations of the layer of the trained neural network from which the latent representation is produced. During the optimization, the mask may then be updated to gradually obscure (or block or delete) parts of the latent representation, and the objective function may be formulated to minimize a classification score, whilst also minimizing the modification component of the objective function.

Optionally, the method further comprises obtaining a dataset comprising a plurality of first input images, obtaining a respective plurality of latent representations of the plurality of first input images and clustering the first input images of the dataset into a plurality of clusters. For a cluster of the plurality of clusters, the method may further comprise determining an aggregate mask across latent representations of the first input images in said cluster. The method may further comprise determining a cluster from the plurality of clusters to which the input image belongs, and initializing the mask as the aggregate mask corresponding to the determined cluster. By doing so, information from previously input samples may be used in order to improve the efficiency of the optimization process. The aggregate mask determined for the cluster to which the input image belongs may provide a better "starting point" for the mask, in comparison to initializing the mask values to be entirely perturbative or entirely non-perturbative, as discussed above. This may reduce the number of iterations required in order for the classification score to reach the appropriate threshold, thus speeding up the method and reducing the processing resources and power required. Additionally, this may help in avoiding local optima, and thus provide a better optimum.

Optionally, the aggregate mask is determined by computing an average mask across the latent representations of the first input images in said cluster. The use of an average mask may provide an improved starting point for the mask initialization, by using information already obtained by applying the optimization to a plurality of similar input images. This may reduce the number of iterations required in order for the classification score to reach the appropriate threshold, thus speeding up the method and reducing the processing resources and power required.

Optionally, the method further comprises obtaining a dataset comprising a plurality of first input images, obtaining a respective plurality of latent representations of the plurality of first input images and clustering the first input images of the data set into a plurality of clusters. For each cluster, the method may be further configured to compute a set of at least one of a group of: most frequently masked neurons, most frequently masked filters and most frequently masked layers of the trained neural network. The method further comprises determining a cluster of the plurality of clusters to which the input image belongs. The mask may then be determined so as to indicate modifications to a subregion of the latent representation, the subregion being determined by the computed set corresponding to the cluster to which the input image belongs. By doing so, the optimization process may focus on a smaller region over which to apply the mask, thereby speeding up the optimization process. The information regarding the most frequently masked neurons, most frequently masked filters and most frequently masked layers of the trained neural network for the first input images in said cluster may additionally or alternatively be used to initialize the mask, and thereby provide a better starting point for the optimization process, in comparison to the entirely perturbative or entirely non-perturbative initializations previously discussed.

Optionally, the internal layer is a convolutional layer in the trained neural network, such as the convolutional layer immediately preceding a first dense layer. Deeper convolutional layers of the trained neural network should respond strongly to concepts that are likely to be highly localized in the image. By using the last convolutional layer in a trained neural network, the receptive field of the internal layer will cover more (if not all) of the image, and information on highly localized and complex features may be determined. Additionally, adversarial solutions may be avoided, as it is unlikely that these would be translated to the deeper convolutional layers of the trained neural network.

Optionally, the input image comprises an image-based representation of at least one of a group of: image data, audio data, video data, text data, radar data, LiDAR data and time series data. The method is not limited to only image data, and may be used with any data, once represented in an image-based form. This enables the method to be used for a wide range of applications, for example involving the explainability of classifying audio data.

Optionally, obtaining the input image comprises obtaining the image from a sensor. For instance, sensor data represented as an image may be obtained by means of an input interface. Such sensor data may comprise, for instance, image/video/radar/LiDAR/ultrasonic sensor data, etc. Classification of sensor data is being used for more and more critical applications, in such application domains as optimization of automated manufacturing processes, medical image analysis or diagnosis, and the like, making it increasingly important to explain how trained neural network classifies inputs.

Optionally, outputting the explainability mask comprises at least one of outputting the explainability mask in a sensory perceptible manner to a user and outputting the explainability mask to a processor subsystem. For instance, the user may inspect the explainability mask to understand how the trained neural network arrived at its classification. This may indicate to the user whether the trained neural network is adequately trained, or it may alert the user to hidden biases stemming from an inadequate training dataset, for example. The explainability mask may additionally or alternatively be output to a processor subsystem, which allows the explainability mask to be used in an automated process. For example, the explainability mask may be used in a manufacturing process involving automated optical quality inspection, and the location of highlighted features in the explainability mask corresponding to an image of a product may determine how that product is routed or subsequently sorted or handled.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
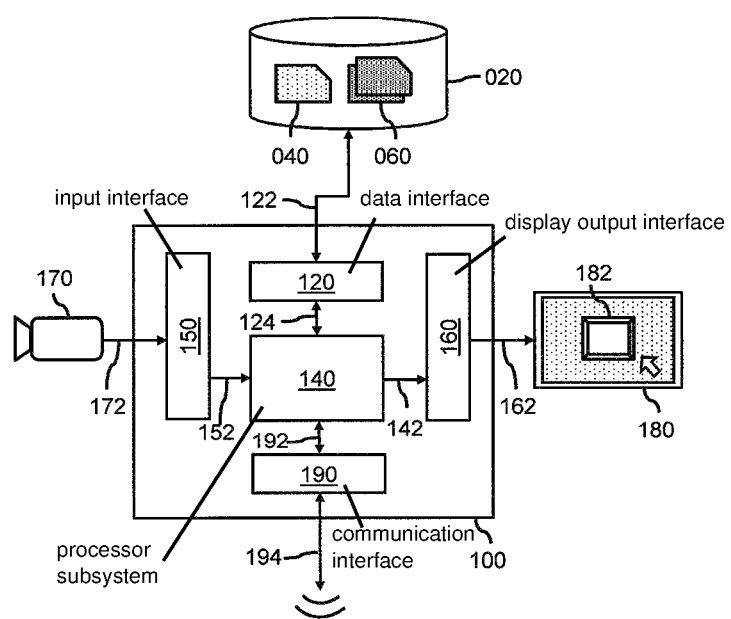
FIG. 1 shows a system for determining an explainability mask for a classification of an input image by a trained neural network, in accordance with an example embodiment of the present invention.

FIG. 1 shows a system 100 for determining an explainability mask for a classification of an input image by a trained neural network, while FIGS. 2a to 5 further describe a method of the same, with further elucidation.

The system 100 may comprise a data interface 120 and a processor subsystem 140 which may internally communicate via data communication 124. The data interface 120 may be for accessing the trained neural network 040, and optionally an input image in the form of data 060. In some embodiments, a latent representation of the input image may also be accessed by data interface 120. For example, as shown in FIG. 1, the data interface 120 may provide access 122 to an external data storage 020 which may comprise said data 040, 060. Alternatively, the data 040, 060 may be accessed from an internal data storage which is part of the system 100. Alternatively, the data 040, 060 may be received via a network from another entity. In general, the data interface 120 may take various forms, such as a network interface to a local or wide area network, e.g., the Internet, a storage interface to an internal or external data storage, etc. The data storage 020 may take any conventional and suitable form.

The processor subsystem 140 may be configured to, during operation of the system 100 and using the data interface 120, obtain the input image and the latent representation of the input image. In some embodiments, the latent representation of the input image may be obtained by inputting the input image to the trained neural network 040 and determining the latent representation of the input image that is output from the k-th layer of the trained neural network 040. In other embodiments, the latent representation of the input image may have already been determined, and may be readily accessible, e.g., in memory.

The processor subsystem 140 may be configured to initialize a mask for indicating modifications to the latent representation. The mask may have the same spatial dimensions and depth as the latent representation. There are several ways in which the mask may be initialized, for example, by setting all values of the mask such that the latent representation is completely unaffected (i.e., a mask having no perturbative effect). Conceptually, this can be considered a "blank" mask. In another example, the mask may be initialized with values which replace the latent representation with a zero-activation latent representation, which is a latent representation in which the activations of said layer are blocked or hidden. In other examples, the mask may be initialized based on information from a plurality of input images to determine a set of initial mask values—two such processes will be described with reference to FIGS. 4a-4c.

Figure 3:
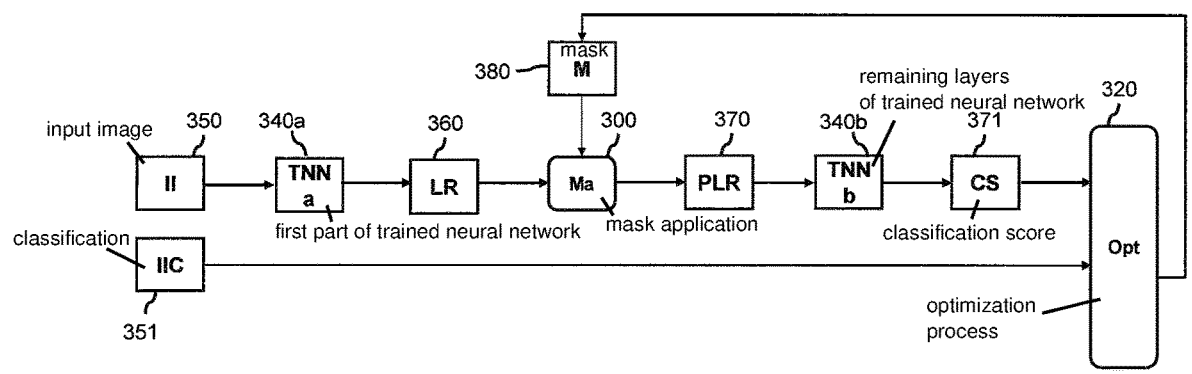
FIG. 3 shows a detailed example of a method of determining a mask by optimizing an objective function, in accordance with the present invention.

The processor subsystem 140 may further be configured to update the mask by iteratively adjusting values of the mask to optimize an objective function. The objective function comprises a modification component and a classification score component. The modification component indicates the degree of modifications indicated by the mask. In some embodiments, the modification component penalises masks with a large degree or a large amount of modifications, for example by using a constraint. Such a constraint may be a hard constraint, which ensures that the degree or amount of modification is below a threshold amount, or a soft constraint, which penalises higher amounts or degrees of modification. In other embodiments, the modification component rewards a large degree or a large amount of modifications. This will be discussed in more detail with reference to FIG. 3. The classification score component may be determined by applying the modifications indicated by the mask to the latent representation (in other words, applying the mask to the latent representation) to obtain a perturbed latent representation, and determining the classification score of the perturbed latent representation according to the trained neural network 040. In other words, the perturbed latent representation is used as an input to the next layer of the trained neural network 040, thereby continuing to progress through the trained neural network 040 to obtain the classification score. This is illustrated in FIG. 3b and will be described in more detail in the associated section of the description. A classification score may be obtained through any conventional method, e.g., a softmax probability layer of a neural network, a distance to a decision boundary of a Support Vector Machine, etc. For instance, a binary classifier may assign a confidence score s of recognizing a certain class, e.g., a value between 0 and 1. If the input instance belongs to that class, the classification score may be equal to s whereas if the input instance does not belong to that class, the value s may be inverted, e.g., 1-s. Classification scores can also be determined for multiclass classifiers, e.g., some multiclass classifiers provide confidence scores for each possible class, in which case the classification score of the perturbed latent representation may be selected as the classification score of the class to which the input image belongs. The classification score can also simply indicate whether the trained neural network classifies the perturbed latent representation in a same class as the input image.

Once the mask has been updated by optimizing the objective function, the processor subsystem 140 may be configured to scale the mask to a spatial resolution of the input image, in order to obtain the explainability mask. That is, the scaled mask may have the same spatial resolution as the input image. If the updated mask has a smaller spatial resolution than the input image, it may be upscaled using any conventional technique, such as bilinear upsampling or using a series of transposed convolutions or deconvolutions, although many alternative scaling means are available and may be used to achieve the scaled mask.

The processor subsystem 140 may be further configured to output the explainability mask. In some embodiments, the processor subsystem may output the explainability mask to another processing system, network entity, computer program or function, allowing the explainability mask to be used for, e.g., an automated process or to further refine the trained neural network 040. As an optional component, the system 100 may comprise a display output interface 160 or any other type of output interface for outputting the determined mask and/or the perturbed instance obtained by applying the determined mask to the input instance 142 to a rendering device, such as a display 180. For example, the display output interface 160 may generate display data 162 for the display 180 which causes the display 180 to render the determined mask and/or the perturbed instance 142 in a sensory perceptible manner, e.g., as an on-screen visualization 182. In some embodiments, the processor subsystem 140 outputs the explainability mask in a sensory-perceptible manner, such as on screen or via sound, to a user.

As an optional component, the system 100 may comprise an image input interface 150 or any other type of input interface for obtaining sensor data from a sensor, such as a camera 170. The sensor data may be comprised in the input instance. For example, the camera may be configured to capture image data 172, processor subsystem 140 being configured to obtain the input instance 152 from image data 172 obtained via input interface 150.

The system 100 may also comprise a communication interface 190 configured for communication 194 with another system or entity, such as an actuator or automated system.

For example, if the system 100 were used to determine an explainability mask that could later be used in determining how a product in a manufacturing process is handled, the communication interface 190 may communicate with a system or actuator controlling the manufacturing process. Communication interface 190 may internally communicate with processor subsystem 140 via data communication 192. Communication interface 190 may be arranged for direct communication with another system, e.g., using USB, IEEE 1394, or similar interfaces. Communication interface 190 may also communicate over a computer network, for example, a wireless personal area network, an internet, an intranet, a LAN, a WLAN, etc. For instance, communication interface 160 may comprise a connector, e.g., a wireless connector, an Ethernet connector, a Wi-Fi, 4G or 4G antenna, a ZigBee chip, etc., as appropriate for the computer network. Communication interface 190 may also be an internal communication interface, e.g., a bus, an API, a storage interface, etc.

Various details and aspects of the operation of the system 100 will be further elucidated with reference to FIGS. 2 and 3, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA). In general, each functional unit of the system may be implemented in the form of a circuit. It is noted that the system 100 may also be implemented in a distributed manner, e.g., involving different devices or apparatuses, such as distributed servers, e.g., in the form of cloud computing.

The trained neural network 040 may be parameterized by a set of parameters. The set of parameters may comprise weights of nodes of the trained neural network. For example, the number of layers of the trained neural network may be at least 5 or at least 10, and the number of nodes and/or weights may be at least 1000 or at least 10000. Depending on the particular application, various conventional architectures for neural networks may be used. It is beneficial from the point of view of efficiency of training to use a generative model which is amenable to gradient-based optimization, e.g., which is continuous and/or differentiable in its set of parameters.

Figure 2A:
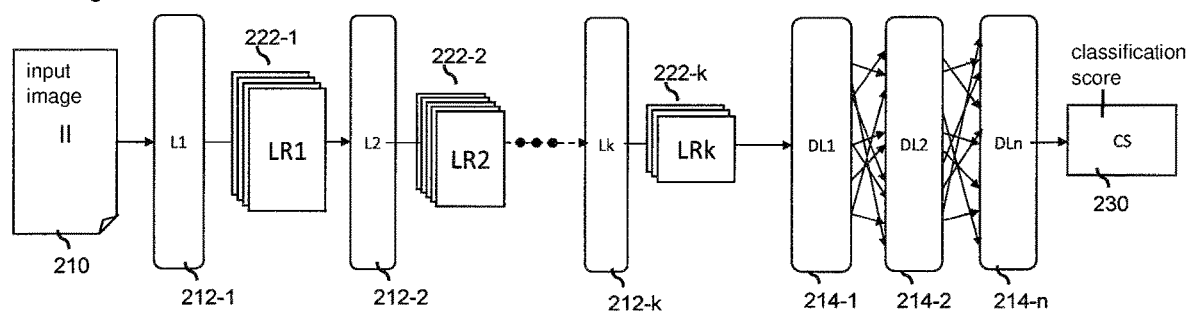
FIG. 2a shows a schematic of a trained neural network in accordance with an example embodiment of the present invention.
Figure 2B:
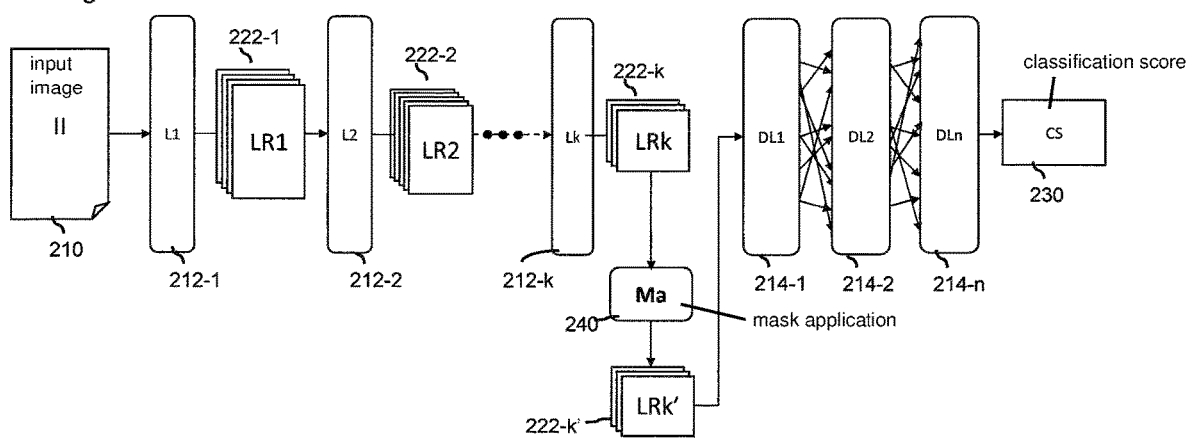
FIG. 2b shows a non-limiting example of a method of accessing a trained neural network, in accordance with an example embodiment of the present invention.

FIG. 2a shows a schematic of a trained neural network, such as trained neural network 040 of FIG. 1, which may be accessed by the system 100 of FIG. 1, and FIG. 2b illustrates a non-limiting example of a method of accessing the trained neural network 040 of FIG. 1. Various features in FIG. 2a are explained with reference to a system for image classification, but as the skilled person understands, this is not a limitation, as the techniques are readily applied to other kinds of instances. For example, various types of data may be provided in an image-based representation, such as video data, audio data, sensor data (e.g., obtained from a sensor), radar/LiDAR data, and/or time series data.

The process illustrated in FIG. 2a describes, at a high level and greatly simplified, a classification of an input image in a convolutional neural network (CNN), for the sake of illustration. Other types of neural networks, such as deep neural networks, may also be used, as the skilled person will understand, and the following example is non-limiting and merely exemplary.

CNNs can typically be conceptually divided into two components—a convolutional part, comprising at least one convolutional layer, and a dense (e.g., fully-connected) part, comprising at least one dense layer.

An input image I1 210 is input into trained neural network 040 of FIG. 1, more specifically to a first layer L1 212-1 of filters (or in some cases, a single filter). Each of the filters may convolve over the input image I1 210, producing an activation volume, or "latent representation" LR1 222-1. Each "slice" of the activation volume may be the output of one of said filters. Latent representation LR1 222-1 may have a different spatial resolution than the input image I1 210. Latent representation LR1 222-1 may then be used as an input to the subsequent layer, L2, 212-2. The filter(s) of L2 212-2 may then convolve over latent representation LR1 222-1 to produce a second latent representation, LR2, 222-2. This process may continue for further layers 212.

It should be noted that throughout the convolutional part of the CNN, the spatial relationship of latent representations to the input image is preserved, although the spatial dimensions of latent representations may differ from one latent representation to another, and from the spatial dimensions of the input image.

After the last layer Lk 212-k of the convolutional part of the CNN (often referred to as the last convolutional layer, although in some embodiments the last layer Lk of the convolutional part may not necessarily be a convolutional layer, provided it preserves the spatial relationship as discussed above), the resulting latent representation LRk is input into the first of the dense layers DL1 214-1. The dense layers DL1 214-1, DL2 214-2, to DLn 214-n may be fully-connected layers, in which the neurons of each fully-connected layer are connected to all of the neurons in another layer. After passing through the dense part of the CNN, a classification score CS 230 (or set of classification scores) may be output.

In order to explain how trained neural network 040 of FIG. 1 determines the output classification score, it is useful to determine an explainability mask which highlights areas or regions of the input image that contributed most to the output classification. This mask may be applied to a latent representation of the input image at a given layer of the trained neural network 040. In other words, in order to determine what region(s) of the input image were most relied upon for determining its classification, a mask may be determined, which modifies the activations of filters within the trained neural network 040 of FIG. 1 as minimally as possible, whilst resulting in a sufficiently different (or in some embodiments, pre-specified) classification score or outcome. The mask may have the same spatial dimensions and depth as the latent representation. In some embodiments, the mask may be optimized such that its application to a latent representation results in a classification score below a threshold classification score.

The mask indicates modifications which, in effect, delete or block (either fully or partially) information that is passed forward to subsequent layers. That is, when a mask is applied to a latent representation, specific activations, as indicated by the mask, are at least partially ignored in the subsequent (i.e., deeper) layers. The classification score resulting from this perturbed latent representation may differ from the classification score of the input image as obtained following the process of FIG. 2a.

The perturbation of a latent representation and subsequent classification score output is illustrated in FIG. 2b. FIG. 2b differs from FIG. 2a in that, at a particular layer, in this case layer Lk 212-k, the resulting latent representation LRk 222-k is perturbed by applying a mask in mask application Ma 240. The perturbed latent representation, LRk' 222-k', is then used as the input to the deeper layers DL1 214-1, DL2 214-2, to DLn 214-n.

In FIG. 2b, latent representation LRk 222-k being perturbed in the last layer of the convolutional part of the network, and immediately precedes any non-convolutional layers, such as pooling layers, dense layers, fully-connected layers and so on. This is advantageous in that adversarial solutions may be reduced or even prevented from having an unwanted effect on classification score. Adversarial solutions are features of an image which trigger a classification with a high level of confidence, despite being incorrect. Deeper layers of a CNN typically have a coarser spatial resolution than the input image and are therefore less likely to translate adversarial solutions. However, the latent representation to be perturbed by the mask need not be output from the last layer of the convolutional part of the network. In some embodiments, the latent representation to be perturbed may be the output of one or more earlier layers. In these cases, the perturbed latent representation continues through the remainder of the CNN, including any remaining layers of the convolutional part of the CNN.

FIG. 3 shows a detailed yet non-limiting example of a computer-implemented method of determining a mask by optimizing an objective function, which method may be performed by, for example, the system 100 of FIG. 1. As in FIGS. 2a and 2b, various features in FIG. 3 are explained with reference to a system for image classification, but as the skilled person understands, this is not a limitation in that the techniques are readily applied to other kinds of instances, e.g., various types of sensor data as obtained, for example, from a sensor.

Shown in FIG. 3 is a trained neural network TNN, 340, trained to classify input images. Trained neural network TNN 340 is a neural network with a latent space, e.g., a space of latent features.

For instance, trained neural network TNN 340 may comprise, for example, a deep neural network and/or a CNN.

Shown also are an input image I1, 350, and a classification IIC, 351, of the input image according to the trained neural network. For instance, classification IIC 351 may be obtained by evaluating trained neural network TNN 340 on input image I1 350, or classification IIC 351 may be a ground truth classification, e.g., of a training dataset from which trained neural network TNN 340 was trained.

Input image I1 350 may be input into a first part of the trained neural network TNNa 340a. A latent representation LR 360, such as LRk 222-k of FIG. 2b, may be identified as the output of the k-th filter of the trained neural network TNN 340. The first part of trained neural network, TNNa, 340a may be considered to comprise the input layer to the k-th layer of trained neural network 040 and may be referred to as "part A" of trained neural network 040. A mask M, 380, may then be applied to latent representation LR 360 in mask application process 300 to obtain a perturbed latent representation PLR, 370. The values of mask M 380 are preferably bounded by [0,1].

Mask M 380 may be initialized in one of several ways. Some non-limiting examples of mask initialization include initializing all of the values of mask M 380 to have no perturbative effect on latent representation LR 360, such that perturbed latent representation PLR 370 is unchanged from latent representation LR 360, or initializing all of the values of mask M 380 such that any activations from the layer outputting latent representation LR 360 are effectively deleted, the resulting perturbed latent representation PLR 370 thus being a "zero-activation" latent representation. Further examples of mask initializations will be described with reference to FIGS. 4a-4c.

Perturbed latent representation PLR 370 may then proceed to the remaining layers of the trained neural network TNNb 340b, also referred to as "part B" of trained neural network 040. Trained neural network TNNb 340b may be considered to comprise the layers of trained neural network 040 that were not included in part A, i.e., that were not included in trained neural network TNNa 340a. In other words, trained neural networks TNNa 340a and TNNb 340b, when concatenated, result in trained neural network 040.

Trained neural network TNNb 340b may then determine a classification score 371 of the perturbed latent representation PLR 370, which is used in optimization process 320.

Optimization process Opt, 320 denotes an optimization of an objective function, such as a loss function or energy function, comprising a modification component and a classification score component. In some embodiments, such as when mask M is assigned values in the range of [0, 1] in which a value of 0 indicates "blocking" (e.g., deleting) an activation and a value of 1 has no perturbative effect, the objective function may take the form of Equation 1:

$$M^* = \min(M) : \lambda_1 * \|1-M\| + f_{P(A_k),q}(x)$$ [Equation 1]

in which:
x is the input image;
$\lambda_1$ is a weighting term;
$\|1-M\|$ is a norm of an inverse of mask M; and
$f_{P(A_k),q}(x)$ corresponds to the classification score for class q at perturbed latent representation $P(A_k)$ of input image x, the perturbed latent representation $P(A_k)$ being the latent representation of the output of layer k which has been perturbed by mask M.

The weighting term may be a hyperparameter. The weighting term may be a real-valued weighting term defined a-priori which balances the importance of having a mask with a small amount of modifications versus a mask that minimizes the classification score. This value may vary depending on the trained neural network and/or input image.

The objective function may thus comprise a modification component and a classification score component. In the example of Equation 1, the modification component is the first term, i.e. $A_1 * \|1-M\|$, and the classification score component is provided by the second term, i.e. $f_{P(A_k),q}(x)$. Although depicted here as a norm of the inverse of mask M, other regularization terms may similarly be used, such as L1 or L2 regularization, or the like.

An iterative process is used in order to determine a mask M 380 which minimises the amount of modifications (e.g., affects as small an area of the input image/latent representation as possible) whilst also minimising the classification score resulting from the latent representation perturbed by the mask.

Optimization process Opt 320 determines mask M 380 which is modified from the previous version of mask M 380 and the iterative process shown in FIG. 3 continues. That is, the updated mask M 380 is applied to the latent representation LR 360 in mask application process Ma 300, the resulting perturbed latent representation PLR 370 is input into part B of the trained neural network 040, i.e., trained neural network TNNb 340b, and the classification score of the perturbed latent representation is determined. The values of the mask M 380 are then modified accordingly and the iterative process repeats.

This iterative process may continue for a predetermined number of iterations, or until an optimum is found (for example, until the change in output is sufficiently low), or until the classification score of the perturbed latent representation reaches a threshold classification value, or differs from the classification score of the input image by a specified amount or percentage. In some embodiments, the classification score of the input image may be obtained according to the trained neural network 040, in order to be used in comparison with the classification scores arising during the mask updating process. In some embodiments, it may suffice to iterate until the trained neural network 040 no longer determines the correct classification of the input image, i.e., until the classification score of another classification becomes larger than the classification score of the classification of the input image. For example, in a simple multi-class image classification system, if an input image is determined to be of the 'cat' class, the iterative process may terminate when the perturbed latent representation is determined to be of a different class, such as 'fish'. However, these termination conditions are merely non-limited examples thereof, and other termination conditions may be employed.

The objective function to be optimized may depend, to an extent, on how mask M 380 is initialized. The objective function as denoted in Equation 1, for example, is suitable in many situations, such as when the mask is initialized such that upon applying the initialized mask to a latent representation, the resulting perturbed latent representation is identical to the latent representation to which the mask was applied (i.e., an "invisible" mask).

However, if the mask were initialized in such a way as to block all activations from a layer, e.g., layer k, of the trained neural network 040 from which the latent representation to be perturbed is output, the objective function may be expressed differently, for example as in Equation 2 below:

$$M^* = \min(M) : \lambda_1 * \|M\| - f_{P(A_k),q}(x) \qquad \text{[Equation 2]}$$

In Equation 2, the modification component is based on the norm of mask M. Minimising the modification component is therefore equivalent to maximising the degree or amount of activations being blocked by the mask M. In other words, the modification component is minimised as the values of M approach 0. Values of M approaching 0 provide a greater perturbative effect (and values of M approaching 1 provide a lesser or no perturbative effect).

In this example, the objective function is optimized by minimising the modification component, in other words by maximising the amount of activations being blocked by the mask, and maximising the classification score component. Conceptually, this approach involves beginning with a mask that blocks all activations of a layer and gradually unblocks activations. The aim is to determine the lowest amount of activations to unblock in order to obtain the classification. The lowest amount of activations being unblocked is conceptually equivalent to the highest amount of activations to remain blocked by the mask. Hence, in this case, the objective function may maximise the degree or amount of modifications (thereby minimizing the modification component as defined in relation to Equation 2) and also maximise the classification score component.

Although in Equation 1, a norm of 1-M is used and in Equation 2, a norm of M is used, it is to be understood that these may be switched, depending on how the mask values are defined. For example, if a mask value of 1 is interpreted as having no perturbative effect and a mask value of 0 is interpreted as having a blocking effect, the formulations of Equations 1 and 2 above should be unchanged, but if a mask value of 0 is interpreted as having no perturbative effect and a mask value of 1 is interpreted as having a blocking effect, the modification component expressions may be swapped. In the former case, applying the mask may involve multiplying the mask with the latent representation. In the latter case, however, applying the mask may involve multiplying the mask inverse (1-M) with the latent representation.

These examples illustrate two "extreme" initializations—the first in which no perturbations are made, and the second, where all activations are blocked. In the first of these initializations, the optimization process increases the modifications indicated by the mask M whilst determining if the classification score of the latent representation perturbed by mask M is low enough (according to at least one termination condition)—e.g., until the trained neural network does not satisfactorily determine the class. Conversely, in the second initialization described above, the optimization process "removes" modifications (i.e., gradually allows more activations to occur) whilst determining if the trained neural network classifies the perturbed latent representation appropriately and to what degree.

In the first initialization example, a termination condition such as those described previously may relate to whether the classification score component falls below a threshold classification score, whereas in the second initialization example, a termination condition such as those described previously may instead relate to whether the classification score exceeds a threshold classification score.

In some embodiments, the optimization process may preferably be configured to extend to preceding layers of the trained neural network in some situations—for example, if the classification score component of the objective function does not meet a classification threshold. For the first mask initialization approach discussed previously for example, this extension may be implemented if the classification score component does not fall below a classification threshold, and for the second mask initialization approach discussed previously, the extension may be implemented if the classification score component does not exceed a classification threshold.

If the classification score component does not meet the appropriate threshold after a predetermined number of iterations, the method may proceed to extend the mask M 380 to additionally cover the latent representation of the preceding layer of the trained neural network 040 of FIG. 1. For example, if the latent representation of layer k is initially used and the classification score component does not meet the appropriate classification threshold after the predetermined number of iterations, the mask is extended to also cover the latent representation of layer k−1. Optionally, this process may repeat until the classification score component of the objective function reaches (or crosses) the classification threshold. In other words, the mask may be extended to cover latent representation LRk and latent representation LR(k−1). Should the classification score component still not reach the classification threshold, the mask may be extended to cover latent representation LRk, latent representation LR(k−1) and latent representation LR(k−2) and so forth, until the classification threshold is met. It is to be appreciated that it is also possible to extend the mask to cover subsequent or later layers, provided the spatial relationship with the input image is still preserved. Preferably, however, the initially selected layer should be a deep layer in order to discern features that are highly localised in space, in contrast to features that may be found broadly over the image, such as textures, which are typically represented in lower (e.g., shallower) layers.

In some embodiments, the mask is extended to cover multiple layers as described above and the objective function is optimized over said multiple layers. In this case, the mask spans across these multiple layers throughout the optimization process and is updated accordingly. More specifically, in an example in which the mask extends across two layers, a first part of the mask is applied to the latent representation of the earlier of the two layers (e.g., layer k−1) and the perturbed earlier latent representation proceeds through layer k (i.e., the subsequent layer) to produce a next latent representation, i.e., the output from layer k. A second part of the mask is then applied to this next latent representation to obtain a perturbed next latent representation, which may then continue through the remainder of the trained neural network 040 of FIG. 1 to obtain a classification score. During the optimization of the objective function, values in both parts of the mask may be updated/altered.

In some embodiments, extending the mask over multiple layers comprises first determining an updated mask $M_k$ for a particular layer, for example layer k, by optimizing the objective function. Despite the optimization, the classification score component may not be at an appropriate threshold, so the method may continue to the preceding layer. In this case, the method continues by selecting layer k−1 (or in some cases, merely an earlier layer, although it is generally preferable to select the layer immediately preceding the initially used layer). The method repeats as described above and an updated mask $M_{k-1}$ for the latent representation of layer k−1 may be determined. The mask may then be a combination of $M_k$ and $M_{k-1}$. The classification score may then be determined by applying the mask $M_{k-1}$ (i.e., the optimized mask for the latent representation of layer k−1) to obtain a perturbed latent representation for layer k−1, inputting the perturbed latent representation for layer k−1 to the subsequent layer of the trained neural network 040 of FIG. 1 (in this case, layer k), obtaining the latent representation for layer k, perturbing the latent representation for layer k with mask $M_k$, and proceeding through the remainder of the trained neural network 040 of FIG. 1 by inputting the perturbed latent representation for layer k into the subsequent layer of the trained neural network (in this case, layer k+1). If the obtained classification score, using both of these masks, meets the requisite criteria, the combination of mask Mk−1 and mask Mk is upscaled, using any conventional means as described above, to obtain the explainability mask.

If, however, the obtained classification score still does not meet the requisite criteria, the method repeats at the preceding layer, k−2, and so on, until the resulting classification score meets the requirements.

Figures 4A, 4B, 4C:
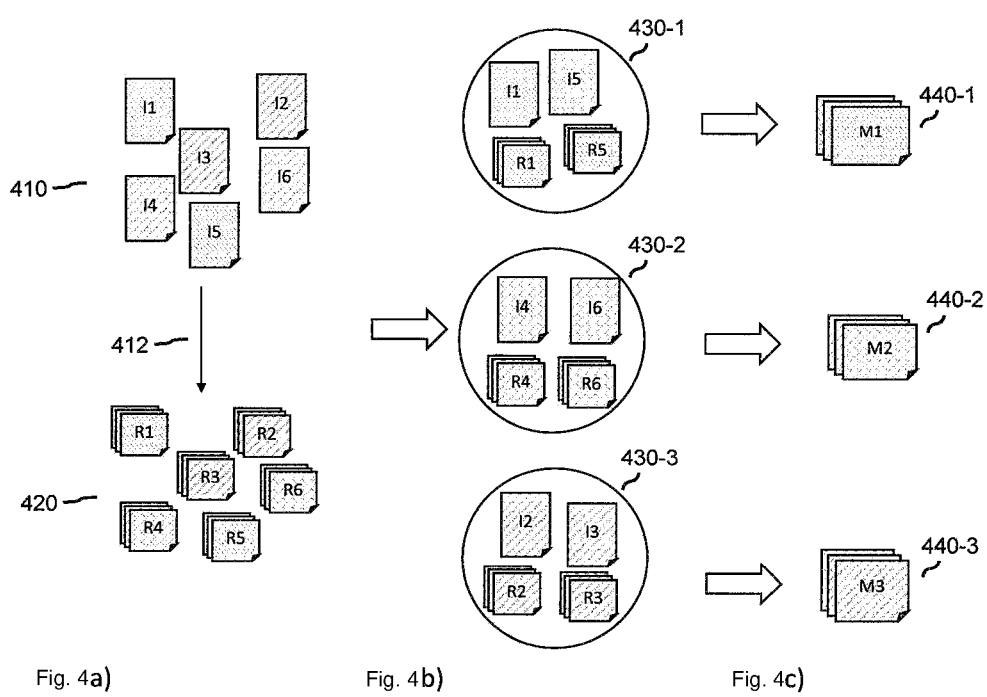
FIGS. 4a-4c show an illustrative process of clustering multiple input images for improving mask initialization, in accordance with an example embodiment of the present invention.

FIGS. 4a-4c show an illustrative process of clustering multiple input images for improving mask initialization.

Starting in FIG. 4(a), multiple input images I1, I2, I3, I4, I5 and I6, collectively referred to as 410, are accessed by system 100. Although FIG. 4(a) depicts six input images, it is to be understood that this is not a limiting number—any number of input images may be used—and is merely chosen for ease of illustration.

Respective latent representations for the input images 410 may be obtained 412, for example by system 100. That is, system 100 may be configured to apply the trained neural network 040 of FIG. 1 to each of the plurality of input images I1-I6 410 in order to obtain a respective plurality of latent representations R1 to R6, collectively referred to as 420, at a particular layer of the trained neural network 040 of FIG. 1, for example layer k. In some embodiments, the latent representations have been previously determined, either by the system 100 or by another system or server, and may be accessed by the system 100 without the need to re-apply the trained neural network. Latent representation R1 is thus the latent representation of input image I1 at layer k of the trained neural network 040, latent representation R2 is the latent representation of input image I2 at layer k of the trained neural network 040 of FIG. 1, and so on.

The plurality of input images I1 to I6 and their respective latent representations R1 to R6 are then grouped into clusters. The clustering of the input images 410 may be based on deep feature clustering or any conventional clustering means. This is illustrated in FIG. 4(b), in which input images I1 and I5, and their corresponding latent representations R1 and R5, are grouped in a first cluster 430-1, input images I4 and I6 are grouped in a second cluster 430-2 along with their respective latent representations R4 and R6, and input images I2 and I3 are grouped in a third cluster 430-3 along with their corresponding latent representations R2 and R3. The clusters may thus group input images with similar features. An aggregate mask may then be determined for each cluster.

There are several methods of determining the aggregate mask. The first such method is based on determining an average mask.

The average mask method comprises determining a mask for each input image of a cluster according to the method described with regard to FIG. 3. That is, in order to find the average mask 440-1 for cluster 1 430-1, an explainability mask for each of input image I1 and input image I5 may be determined, using latent representations R1 and R5, respectively. An average mask M1 440-1 for cluster 1 is then determined by computing an average of the mask determined for input image I1 and the mask determined for input image I5. In other words, the average mask for a cluster is determined by computing the average of the masks computed for each of the input images in said cluster.

By repeating this process for each of clusters 2 and 3, masks M2 440-2 and M3 440-3 may be respectively determined. In this first method, the average mask for a cluster is the aggregate mask.

The second method of determining the aggregate mask is based on determining which filters, layers, and/or neurons are most frequently masked in a cluster. These filters, layers and/or neurons are then reflected in a mask M1 for the associated cluster.

In this case, the method may comprise computing the most frequently masked layer(s), neuron(s), and/or filter(s) across the cluster. This information may then be used to initialize the mask to indicate modifications to a corresponding subset of the latent representation, for example to block (or partially block) activations of one (or a few) filters in a particular layer. This may also reduce the number of iterations required, thus speeding up the method and reducing processing power requirements.

Both of the above methods may be used to determine an aggregate mask for a cluster. When an input image is received, such as input image I1 350, the method may further comprise determining the cluster to which the input image I1 350 belongs, or most closely resembles, and initializing the mask M 380 as the aggregate mask for said cluster. Determining the cluster to which the input image I1 350 belongs may be done by any conventional means, such as feature comparison, feature clustering, simple comparisons or the like. For example, a distance metric may be used to identify the nearest neighbour between the features of the input image and the clusters. The distance metric may be, for example, an L2 distance, a cosine similarity, or any other conventional distance metric. This may reduce the number of iterations needed for the classification score component of the objective function to meet the requisite criteria as described previously. Reducing the number of iterations would speed up the method and reduce processing power and resources.

In some embodiments, the information regarding the most frequently masked layer(s), neuron(s) and/or filter(s) may be additionally or alternatively used to limit the scope of the updating operation. This information may be used to limit the scope of the updating process in which the mask is initialized according to any of the described mask initializations. For example, information indicating the most frequently masked layer in a cluster may be used to determine at which layer of the trained neural network the latent representation should be obtained and perturbed. In some examples, information indicating the most frequently masked filter(s) in a particular layer may be used to restrict the optimization of the objection function to said filter(s) in said particular layer. By restricting the layers, filters and/or neurons over which to optimize the mask, the process may be quicker and processing power and resource requirements can be reduced. For example, if in a particular cluster, only a few filters are masked, the optimization may be restricted to these filters. In another example, if in a particular cluster, certain neurons or layer are never masked, the optimization may avoid these neurons or layers.

Although the description has thus far referred to images, data of other forms may also be represented in an image-based form and also used in the method as described above. For example, an audio file may be expressed using an image-based representation, i.e., the audio file may take on the form of an image file, and the above method could be used in the manner described above on the image-representation of the audio file. Similarly, video data, sensor data, radar data, time series data, and the like.

In some embodiments, the input image may be obtained from a sensor, such as a camera, radar/LiDAR system, or the like. The sensor data may be represented as an image and used as an input to the trained neural network. In some embodiments, the input image may be obtained from internal or external storage, via a server, downloaded from an external source, or obtained in any other way.

In some embodiments, the explainability mask obtained via the method as described above may be output in a sensory perceptible manner to a user. Prior to being displayed on the display, the explainability mask may be inverted in order to highlight areas of the input image that are deemed by the method to most explain why the input image is classified as a particular classification (e.g., class q). For example, the explainability map may be displayed on a display of system 100 such that a user may see the areas of the input image that were most relied upon by the trained neural network 040 in determining its classification.

In some embodiments, the explainability mask is output to another function within the system 100 or to another system. In these cases, the explainability may optionally be inverted. The explainability mask may be used by a subsequent function or program, e.g., in a processor subsystem, for myriad purposes, such as automated optical inspection or the like.

For example, the explainability mask may be used in a manufacturing process comprising an optical quality inspection system. In this case, the explainability mask may be determined for an input image that comprises a measurement of a product produced in the manufacturing process, and may be classified by a trained neural network to be OK (i.e., meeting some quality criteria) or NOK (i.e., failing to meet said quality criteria). The input image may be input into the trained neural network and an explainability mask may be obtained based on the described method. The explainability mask, which indicates regions of the input image that are most relied upon by the trained neural network for classification of the input image in a particular class, may then be used to appropriately sort, direct, and/or handle the product. For example, if the explainability mask highlights a crack in the top left corner of the input image, it may represent a cracked housing of the product. The product may then be directed to an area of the manufacturing process that can address cracked housings. If the explainability mask highlights an area known to be a weld-point as being the primary reason for the input image (and therefore the product) being classed as "NOK", the product may be directed to a different part of the manufacturing process, and so on.

As a further example within the manufacturing process, if the explainability masks corresponding to many products in a batch consistently indicate a particular aspect of the product that is NOK, the manufacturing process may automatically adjust at least one associated parameter. For example, if welds are consistently indicated in explainability masks of a batch of product as being NOK, the parameters of the welding process may be adjusted. In some cases, a human operator may be alerted to such a problem and the human operator may make requisite adjustments accordingly.

Other examples of the use of explainability masks as determined by the method described herein include processes in the field of autonomous vehicles. For example, an autonomous vehicle may obtain an image of the road ahead via one or more sensors, such as a camera. A trained neural network, such as trained neural network 040, may classify the image as OK (e.g., no detected abnormalities) or NOK (e.g., detection of an abnormality), or may classify the image into further classes. An autonomous vehicle hazard detection system, for example, may use an explainability mask as determined according to the method described herein to ensure that a hazard detection system is operating as expected. If the explainability mask detects an anomaly such as a speed bump or pothole along the bottom of the image, it may indicate a speed bump or pothole in the road, for example, which is generally where speed bumps and potholes are expected to be. If the explainability mask instead detects a speed bump or pothole in the top of an image, such as in the sky, it may determine that the hazard detection system is not behaving as intended, and a warning may be triggered.

Figure 5:
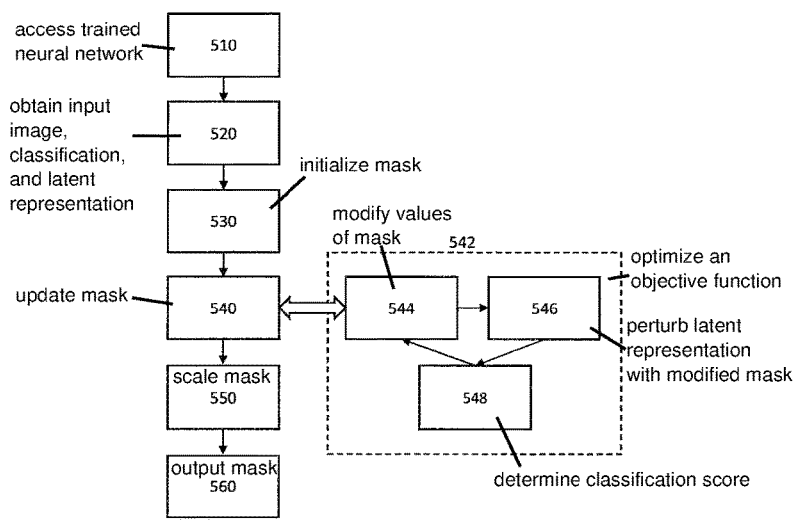
FIG. 5 shows a computer-implemented method of determining an explainability mask for a classification of an input image by a trained neural network, in accordance with an example embodiment of the present invention.

FIG. 5 shows a block-diagram of computer-implemented method of determining an explainability mask for indicating an explainability metric. The method may correspond to an operation of the system 100 of FIG. 1. However, this is not a limitation, in that the method may also be performed using another system, apparatus or device.

The method may comprise, in an operation entitled "ACCESSING TRAINED NEURAL NETWORK", accessing 510 a trained neural network, such as trained neural network 040. The method may further comprise, in an operation entitled "OBTAINING INPUT IMAGE, CLASSIFICATION AND LATENT REPRESENTATION", obtaining 520 the input image, a classification of the input image, and a latent representation of the input image at a layer of the trained neural network. In other words, the latent representation may be the "activation volume" or output of a layer, such as layer k, of the trained neural network. In some embodiments, the latent representation is obtained by inputting the input image to the trained neural network and obtaining the latent representation of layer k after the input image has been processed by layers 0 to k. In other words, the latent representation may be obtained by applying the trained neural network to the input image. In some embodiments, the latent representation may have been previously determined and stored, either by the same system 100 or by another system or external server, and may thus be merely accessed by the system 100. In some embodiments, the classification score of the input image for the obtained classification (i.e., class) may also be obtained. The method may further comprise, in an operation entitled "INITIALIZE MASK", initializing 530 a mask to be updated. The mask indicates modifications to the latent representation. The mask may be initialized, for example, by using any of the methods of mask initialization described herein. For example, the mask may be initialized such that the mask initially has no perturbative effect on the latent representation, or the mask may be initialized such that the activations of layer k of the trained neural network 040 are effectively blocked. In another example, the mask may be initialized using information obtained from a clustering process such as that described with respect to FIG. 4 herein, such as by using an average mask technique or by determining the most frequently masked neuron(s), filter(s) and/or layer(s). The method may further comprise, in an operation entitled "UPDATING MASK", updating 540 the mask. The updating 540 process may comprise optimizing 542 an objective function comprising a modification component and a classification score component. The modification component indicates a degree of modifications indicated by the mask of the latent representation. That is, the degree of modifications may correspond to the relative area (e.g., percentage or proportion) of the latent representation (or correspondingly, to the relative area of the input image) upon which modifications are applied. The degree of modifications may also correspond to a measure of how much the latent representation has been perturbed, such as to denote the magnitude of modifications. That is, the degree of modifications may correspond to how much (spatially) of the latent representation is modified, but in some cases, for example if many neurons are only slightly modified, this may be superseded by, e.g., one large modification to a single neuron (in this case, the magnitude of the modification is primarily considered).

Each iteration of the optimizing 542 of the objective function may comprise modifying 544 values of the mask, perturbing 546 the latent representation with the mask (whose values have been modified), and determining 548 a classification score of the perturbed latent representation, as described previously.

Once the mask has been updated, the method may further comprise, in an operation entitled "SCALE MASK", scaling 550 the mask to a spatial resolution of the input image, in order to obtain the explainability mask. Scaling 550 the mask may be done in any conventional manner, including bilinear upsampling, using a series of transposed convolutions, through the use of inverse convolutions, deconvolutions, or via any other means. The method may further comprise, in an operation entitled "OUTPUTTING MASK", outputting 560 the explainability mask. The explainability mask may be output in a sensory-perceptible manner for a user, such as displayed on a display, or may be output to a processor subsystem, external system or server, a further function or to a computer program. In some embodiments, the method may optionally comprise inverting the explainability mask, before or after scaling the mask, or after outputting the explainability mask.

It will be appreciated that, in general, the operations of method 800 of FIG. 5 may be performed in any suitable order, e.g., consecutively, simultaneously, or a combination thereof, subject to, where applicable, a particular order being necessitated, e.g., by input/output relations.

Figure 6:
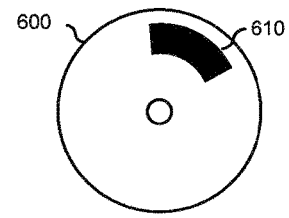
FIG. 6 shows a computer-readable medium comprising data, in accordance with an example embodiment of the present invention.

The method(s) may be implemented on a computer as a computer implemented method, as dedicated hardware, or as a combination of both. As also illustrated in FIG. 6, instructions for the computer, e.g., executable code, may be stored on a computer readable medium 600, e.g., in the form of a series 610 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 600. Alternatively, the computer readable medium 600 may comprise transitory or non-transitory data 610 representing an explainability mask as obtained by any system or method described in this specification.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device enumerated as several means, several of these means may be embodied by one and the same item of hardware. The mere fact that certain measures are described separately does not indicate that a combination of these measures cannot be used to advantage.

What is claimed is:

1. A computer-implemented method of determining an explainability mask for a classification of an input image by a trained neural network, the trained neural network being configured to determine the classification of the input image by determining a latent representation of the input image at an internal layer of the trained neural network and by determining the classification of the input image from the latent representation of the input image, determining the classification comprising determining a classification score of the input image, the method comprising the following steps:
accessing the trained neural network;
obtaining the input image and the latent representation of the input image;
initializing a mask for indicating modifications to the latent representation;
updating the mask by iteratively adjusting values of the mask to optimize an objective function, the objective function including i) a modification component indicating a degree of the modifications indicated by the mask and ii) a classification score component, the classification score component being determined by:
applying the modifications indicated by the mask to the latent representation to obtain a perturbed latent representation, and
determining the classification score of the perturbed latent representation according to the trained neural network;
scaling the mask to a spatial resolution of the input image to obtain the explainability mask; and
outputting the explainability mask.

2. The method of claim 1, wherein the updating of the mask includes ending the updating operation when the classification score of the perturbed latent representation crosses a classification threshold.

3. The method of claim 1, wherein the updating of the mask includes iteratively adjusting the values of the mask for a predetermined number of iterations.

4. The method of claim 1, further comprising:
determining whether, after updating the mask, the classification score of the perturbed latent representation meets a classification threshold; and
when the classification score is determined not to meet the classification threshold:
extending the mask to additionally cover an additional latent representation of the input image at a preceding layer of the trained neural network, and
repeating the updating step.

5. The method of claim 1, wherein the initializing of the mask includes assigning the mask values which replace the latent representation with a zero-activation latent representation.

6. The method of claim 1, wherein the initializing of the mask includes assigning the mask values which have no perturbative effect on the latent representation.

7. The method of claim 1, further comprising:
obtaining a dataset including a plurality of first input images;
obtaining a respective plurality of latent representations of the plurality of first input images;
clustering the first input images of the dataset into a plurality of clusters;
for each cluster of the plurality of clusters, determining an aggregate mask across latent representations of the first input images in the cluster;
determining to which cluster from the plurality of clusters the input image belongs; and
initializing the mask as the aggregate mask corresponding to the determined cluster.

8. The method of claim 7, wherein the aggregate mask is determined by computing an average mask across the latent representations of the first input images in the cluster.

9. The method of claim 1, further comprising:
obtaining a dataset including a plurality of first input images;
obtaining a respective plurality of latent representations of the plurality of first input images;
clustering the first input images of the dataset into a plurality of clusters;
computing a set of at least one of a group of: most frequently masked neurons, most frequently masked filters, and most frequently masked layers of the trained neural network for each cluster of the clusters based on the first input images in the cluster; and
determining to which cluster of the plurality of clusters the input image belongs;
wherein the updating the mask includes determining the mask to indicate modifications to a subregion of the latent representation and determining the subregion by the set corresponding to the cluster to which the input image belongs.

10. The method of claim 1, wherein the internal layer is a convolutional layer of the trained neural network.

11. The method of claim 1, wherein the convolutional layer immediately precedes a first dense layer.

12. The method of claim 1, wherein the input image includes an image-based representation of at least one of: image data, audio data, video data, text data, radar data, LiDAR data, time series data.

13. The method of claim 1, wherein the obtaining of the input image including obtaining the input image from a sensor.

14. The method of claim 1, wherein the outputting of the explainability mask includes at least one of: outputting the explainability mask in a sensory perceptible manner to a user and/or outputting the explainability mask to a processor subsystem.

15. A non-transitory computer-readable storage medium on which is stored data representing a computer program including instructions for determining an explainability mask for a classification of an input image by a trained neural network, the trained neural network being configured to determine the classification of the input image by determining a latent representation of the input image at an internal layer of the trained neural network and by determining the classification of the input image from the latent representation of the input image, determining the classification comprising determining a classification score of the input image, the computer program, when executed by a processor system, causing the processor system to perform the following steps:
accessing the trained neural network;
obtaining the input image and the latent representation of the input image;
initializing a mask for indicating modifications to the latent representation;

updating the mask by iteratively adjusting values of the mask to optimize an objective function, the objective function including i) a modification component indicating a degree of the modifications indicated by the mask and ii) a classification score component, the classification score component being determined by:

applying the modifications indicated by the mask to the latent representation to obtain a perturbed latent representation, and determining the classification score of the perturbed latent representation according to the trained neural network;

scaling the mask to a spatial resolution of the input image to obtain the explainability mask; and outputting the explainability mask.

16. A system for determining an explainability mask for a classification of an input image by a trained neural network, the trained neural network being configured to determine the classification of the input image by determining a latent representation of the input image at an internal layer of the trained neural network and by determining the classification of the input image from the latent representation of the input image, the determining of the classification including determining a classification score of the input image, the system comprising:

a data interface configured to access the neural network and obtain the input image and the latent representation of the input image;

a processor subsystem configured to:

obtain the input image and the latent representation of the input image;

initialize a mask for indicating modifications to the latent representation;

update the mask by iteratively adjusting values of the mask to optimize an objective function, the objective function including: i) a modification component indicating a degree of modifications indicated by the mask, and ii) a classification score component, the classification score component being determined by:

applying the modifications indicated by the mask to the latent representation to obtain a perturbed latent representation; and determining the classification score of the perturbed latent representation according to the trained neural network;

scale the mask to a spatial resolution of the input image to obtain the explainability mask; and output the explainability mask.

* * * * *